Figure 1:
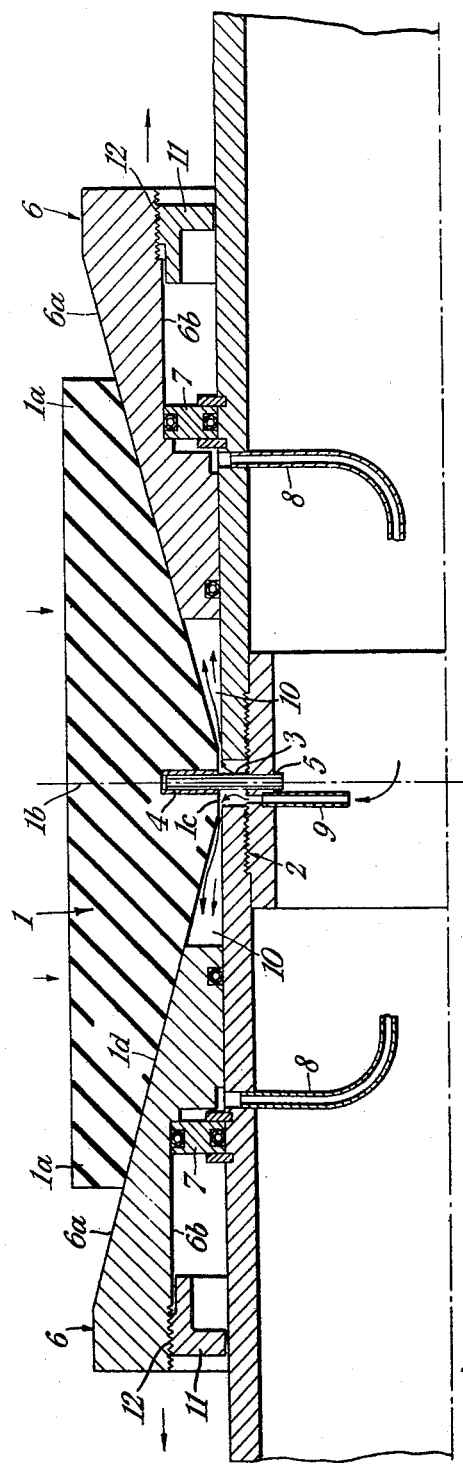

Oct. 3, 1961     H. W. TREVASKIS     3,002,875
APPARATUS FOR BUILDING PNEUMATIC TIRES
Filed Feb. 17, 1958     2 Sheets-Sheet 1

INVENTOR
Henry William Trevaskis
by Benj. T. Rauber
his attorney

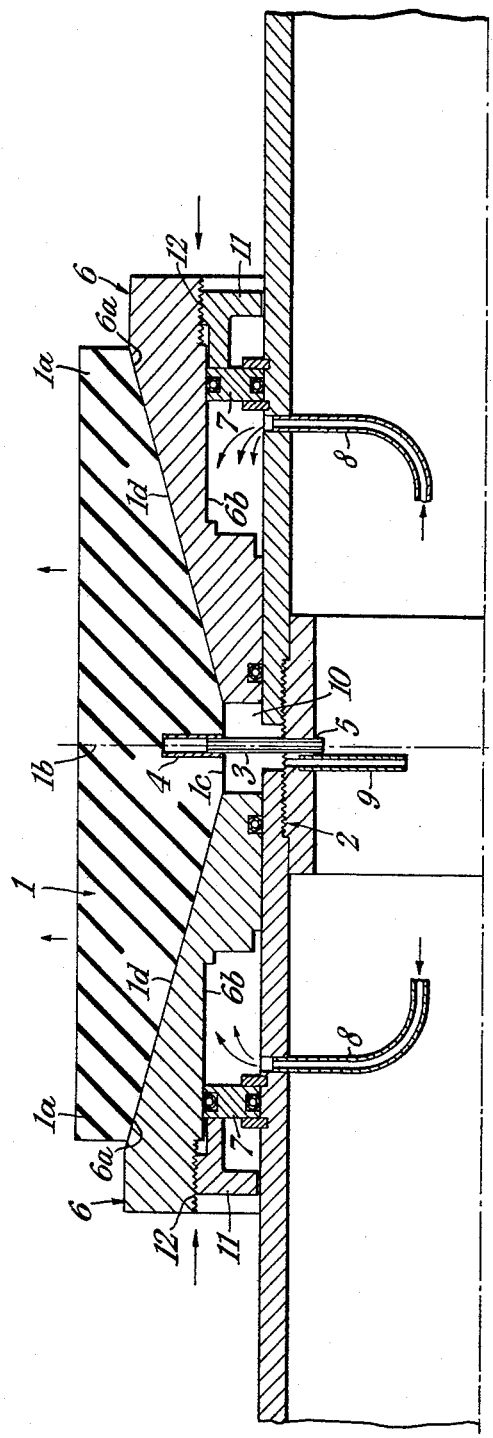

3,002,875
APPARATUS FOR BUILDING PNEUMATIC TIRES
Henry William Trevaskis, Point Pleasant, Blackdown, near Leamington Spa, England, assignor, by mesne assignments, to Dunlop Tire and Rubber Corporation, Buffalo, N.Y., a corporation of New York
Filed Feb. 17, 1958, Ser. No. 715,684
Claims priority, application Great Britain Feb. 20, 1957
6 Claims. (Cl. 156—417)

This invention relates to apparatus for use in the manufacture of pneumatic tires.

The building drum on which a tire carcass is built may be either a solid drum, in which case it is sometimes difficult to remove the carcass from the drum, or a collapsible drum made up of segments which can be collapsed to reduce the diameter of the drum and so facilitate removal of the carcass. In the latter case the construction consists of a large number of moving parts, there are undesirable gaps between the segments when the drum is expanded and there is a risk that the operator may trap his fingers between the segments of the drum.

According to the invention, an expansible tire building drum comprises a resilient sleeve having an inner surface shaped so as to co-operate with the corresponding surface of a wedge member, the wedge member being movable axially relative to the sleeve so as uniformly to vary the external diameter of the sleeve, and means for moving the wedge member axially relative to the sleeve to vary the said external diameter.

The resilient sleeve may be, for example, of natural rubber or a synthetic rubber.

Preferably, the sleeve is formed with its inner surface defined by two co-axial cone surfaces having their smaller diameters at or near the transverse central plane through the sleeve, a pair of wedge members disposed within the sleeve one at each end thereof and guided for axial movement relative to the sleeve, the outer surfaces of the wedge members being complementary to and in contact with the inner surface of the sleeve, and means for moving the wedge members towards or away from one another so as to expand or contract the sleeve.

In use of the apparatus, the sleeve is expanded by approaching the wedge members towards one another, the tire carcass is built on the cylindrical outer surface of the sleeve and the wedge members are then moved apart to allow the sleeve to contract in the radial direction and so permit of withdrawal therefrom of the carcass.

A particular embodiment of a tire building drum according to the invention will now be described with reference to the accompanying drawings, in which:

FIGURE 1 is a diagrammatic axial cross-sectional view of a tire building drum in its contracted state, FIGURE 2 is a diagrammatic axial cross-sectional view of a tire building drum in its expanded state.

The rubber sleeve 1 has an axial length of about 12 to 15 inches and a radial thickness of about 1 inch at each end 1a tapering inwardly from each end to a thickness at the transverse central plane 1b of about 2 inches. The central portion 1c of the interior surface of the sleeve over an axial distance of about 1 inch has a cylindrical formation. The sleeve is centralised on a rigid cylindrical support 2 by means of a series of circumferentially aligned pegs 3 which slidably fit into metal bushes 4 in the central portion 1c of the sleeve 1 and the pegs being secured in corresponding holes 5 in the support 2. The internal surfaces of the tapered portions 1d of the sleeve 1 are inclined at about 15° to the axis of the sleeve. In each end of the sleeve 1 is provided a rigid wedge member 6 slidable on the support 2 and having an outer frusto-conical surface 6a complementary to and in contact with the inner surface 1d of the sleeve 1. Preferably the outer surface of each wedge member 6 is coated with an anti-friction material, for example, the polytetrafluoroethylene material sold under the registered trademark "Teflon." Each wedge member 6 has, extending co-axially from one end, an annular portion 6b which constitutes a cylinder mounted to slide in relation to a piston 7 fixed to the support 2.

The wedge members 6 are moved towards one another (see FIGURE 2) by admitting compressed air to the cylinders 6b via pipes 8. The axial movement of the wedge members is limited by stops 11 axially adjustably secured to the wedge members 6 by screw threads 12 which engage with the pistons 7 when the desired degree of expansion of the sleeve has been obtained. The wedge members 6 may be moved apart again by releasing the pressure in the cylinders 6b and admitting compressed air, via pipe 9 to the space 10 in the interior of the sleeve between the wedge members.

When the wedge members 6 are moved towards one another the rubber sleeve 1 is caused to expand uniformly radially, and on moving the wedge members apart again the resilience of the rubber sleeve causes it to contract.

Alternatively the cylinders 6 may be double-acting and the wedge members moved in both directions by fluid pressure applied to the cylinders. As a further alternative, the wedge members may be spring-loaded to move apart on releasing the pressure from the cylinders 6. If desired the centralising pegs 3 may be dispensed with and the sleeve 1 centered, upon expansion, by shoulders on the wedge members which make contact with the ends of the sleeve when the sleeve is expanded, additional centering abutments being provided at each end of the sleeve and adapted to contact its ends, when contracted.

The apparatus according to the invention may be used for building tires by the conventional method, by the method of wave-winding described in co-pending application of Smith and Lowe, Ser. No. 518,518, filed June 28, 1955, or by the turnover method described in co-pending application of Trevaskis and Lowe, Ser. No. 696,156, filed November 13, 1957, now Patent No. 2,943,668.

Having now described my invention, what I claim is:

1. An expansible tire building drum comprising a wedge member, a resilient sleeve surrounding the wedge member having an inner surface shaped to conform with the outer surface of the wedge member, the wedge member being slidable axially into and out of the sleeve so as alternately to cause the sleeve uniformly to expand and to allow it to contract, and means for relatively moving the sleeve and wedge member to move the wedge member into and out of the sleeve.

2. An expansible tire building drum according to claim 1 wherein the said sleeve is formed with its inner surface defined by two co-axial cone surfaces of a cone having their smaller diameters at or near the transverse central plane through the sleeve, a pair of wedge members disposed within the sleeve one at each end thereof and guided for axial movement relative to the sleeve, the outer surfaces of the wedge members being complementary to and in contact with the inner surface of the sleeve, and means for moving the wedge members towards or away from one another so as to expand or contract the sleeve.

3. An expansible tire building former according to claim 2 wherein the means for moving the said wedge members towards or away from one another comprises a cylinder and piston for each wedge member and means for supplying fluid pressure to the said cylinders.

4. An expansible tire building former according to claim 3 wherein each of the wedge members is slidably mounted on a common shaft, said cylinder being formed on the inner peripheral surface of each wedge member and an associated piston being secured to the shaft.

5. An expansible tire building former according to claim 4 wherein each of the said wedge members is provided with an axially adjustable abutment, said abutment being engageable with the associated piston to limit axial movement of the wedge member.

6. An expansible tire building former according to claim 2 wherein each of the wedge members is axially slidably mounted on a common shaft, and wherein the said sleeve is located axially with respect to the shaft by means of pegs fixed radially in the shaft and slidably secured in corresponding sockets in the sleeve.

References Cited in the file of this patent

UNITED STATES PATENTS

| | | |
|---|---|---|
| 771,902 | Frank | Oct. 11, 1904 |
| 1,921,594 | Thompson | Aug. 8, 1933 |
| 2,084,009 | Sohl | June 15, 1937 |
| 2,182,176 | Maranville | Dec. 5, 1939 |
| 2,614,951 | Iredell | Oct. 21, 1952 |
| 2,715,933 | Frazier | Aug. 23, 1955 |